April 23, 1929.  E. THOMPSON  1,710,648
ICE CREAM FREEZING CYLINDER
Filed May 21, 1927   2 Sheets-Sheet 1
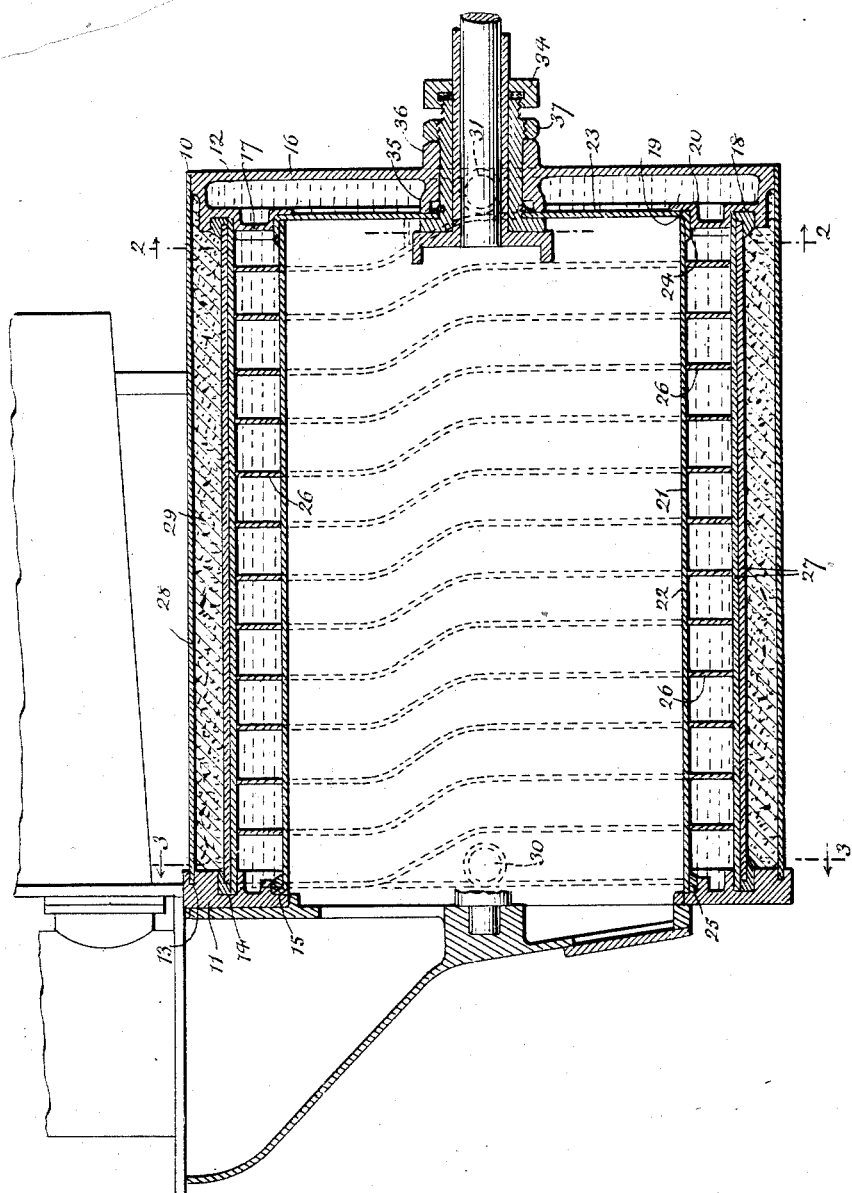
WITNESSES:
H. T. Walker
Chris Peinle
INVENTOR
Emery Thompson
BY
ATTORNEYS April 23, 1929.　　　　E. THOMPSON　　　　1,710,648
ICE CREAM FREEZING CYLINDER
Filed May 21, 1927　　　2 Sheets-Sheet 2
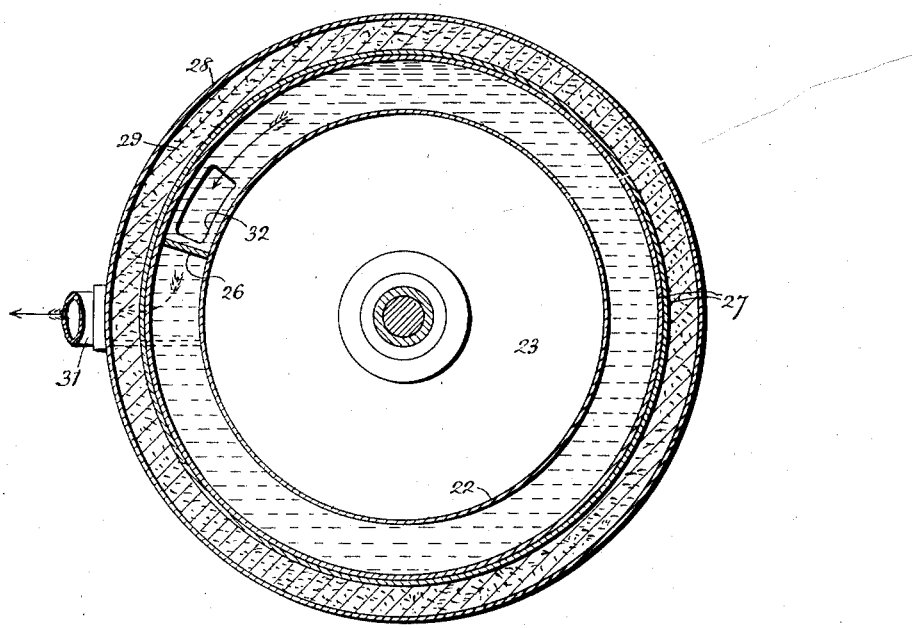
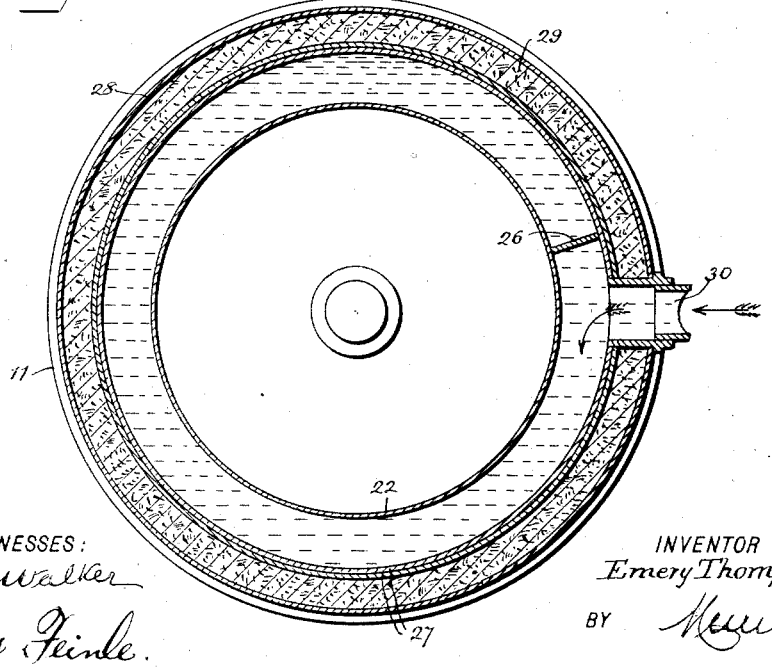
WITNESSES:
INVENTOR
Emery Thompson
BY
ATTORNEYS Patented Apr. 23, 1929.

1,710,648

UNITED STATES PATENT OFFICE.

EMERY THOMPSON, OF NEW ROCHELLE, NEW YORK.

ICE-CREAM-FREEZING CYLINDER.

Application filed May 21, 1927. Serial No. 193,260.

This invention relates to ice cream freezers and has especial reference to the freezing cylinder construction of such freezer.

The principal object of the present invention is to provide a refrigerating construction by virtue of which the freezing mixture may circulate rapidly and continuously so as to shorten the freezing time and therefore lessen the refrigeration costs.

With the foregoing object in view, the invention resides in the particular provision and construction of the parts hereinafter fully described and illustrated in the accompanying drawings, in which—

Figure 1 is a central longitudinal sectional view through an ice cream freezer of the horizontal type and embodying the present invention.

Fig. 2 is a transverse sectional view taken on the line 2—2 of Fig. 1.

Fig. 3 is a transverse sectional view taken on the line 3—3 of Fig. 1.

The object of the present invention is obtained by virtue of certain structural features of the refrigerating means or freezing cylinder. These structural features provide a maximum freezing surface and allow the refrigerant or freezing mixture to circulate rapidly, uniformly, and continuously to carry away the heat of the mixture to be frozen. The freezing time will therefore be shortened, and less refrigeration will be required, and as a consequence costs will be reduced and the out-put of the machine will be increased.

Referring now to the drawings for all of the details, it will be apparent that there has been illustrated the refrigerator means 10 of an ice cream freezer of the horizontal type. The said means 10 includes heads 11 and 12. The head 11 is annular in shape and is provided with annular grooves or recesses 13 and 14, and a rabbet 15. The head 12 is circular and of hollow construction and comprises an end wall 16, inwardly disposed annulus 17 having a recess or annular groove 18, and an annular rabbet 19 provided by an annular flange 20 of angular construction. There is provided an inner freezing cylinder 21 preferably made of German silver and consists of a cylindrical side wall 22 and an end wall 23 having a flange 24 which receives one end of the cylindrical wall 22 to which it may be secured in any suitable manner. Thus there is provided an inner cylinder or receptacle closed at one end and open at the opposite end and also provides a chamber for the mixture to be frozen. The closed end of the inner cylinder so formed will be received in the rabbet 19, whereas, the opposite open end will be received in the rabbet 15, which open end is surrounded by a gasket 25 providing a tight joint at this point. Laid about the cylindrical wall 22 is a spiral, the convolutions 26 of which provide a continuous spiral passageway through which the freezing mixture circulates. Copper cylindrical casings or shells 27 combine with the convolutions 26 to form the passageway. The opposite ends of the shells 27 are received respectively in the recesses or grooves 14 and 18 of the heads 11 and 12. Suitable gaskets are also provided in the recesses 14 and 18 to effect tight joints. The shells 27 are surrounded by a jacket 28. The jacket 28 is cylindrical and one end thereof is received in the annular groove 13 in the head 11, and the opposite end thereof surrounds the head 12 and is secured thereto in any suitable manner. A space occurs between the jacket 28 and the shells 27 which is filled with cork 29 to provide insulation to obtain maximum refrigeration. The freezing mixture enters the spiral passageway through an inlet 30 which communicates with the passageway at one end. The opposite end of the passageway communicates with an outlet 31 embodied by the head 12. The outlet 31 is directly adjacent an opening 32 in the annulus 19, and the said opening 32 is coincident with the outlet end of the spiral passageway. Under this arrangement the freezing mixture such as brine will flow freely in an unobstructed manner continuously through the spiral passageway formed from the inlet 30 to the outlet 31. It will therefore be understood that the rapid and unobstructed circulation of the freezing mixture will materially shorten the freezing time and require less refrigeration, due to the fact that heat contained by the mixture to be frozen will be carried away more rapidly. Furthermore by providing the comparatively thin end wall 23 of German silver, in addition to the cylindrical wall 22, an increased freezing surface is provided. The freezing mixture is allowed to come in direct contact with the wall 23 due to the construction of the head 12.

In order to accommodate the shaft which rotates the mixing paddle, the wall 23 has secured thereto a stuffing box 34. The stuffing box 34 is arranged axially with respect to the cylinder 21. The stuffing box extends through the wall 16 and is surrounded by annular bosses 35 and 36 respectively on opposite sides of the wall 16. The boss 35 abuts the wall 23, and a lock nut threaded on the gland of the stuffing box is screwed home against the boss 36 to set up a tight connection between the parts.

While the invention is described as being incorporated in a horizontal type of freezer, it is to be understood that it may also be incorporated in a vertical type of freezer.

I claim:

1. In a freezer of the class described, an inner cylinder closed at one end by a wall forming a part thereof, an open sided head having an annular rabbet adapted to snugly receive the closed end of the cylinder, said head forming with the end wall of the cylinder a refrigerant chamber, and a refrigerant passageway about the cylinder, said passageway being in communication with said chamber.

2. In a freezer, an inner vessel of non-corrosive metal provided with an end wall, a hollow head open at one side and forming with the end wall a refrigerant space, and a refrigerant passageway extending around the side of the vessel, said passageway being in communication with said space by an opening in said head, and said head having an outlet communicating with said space.

EMERY THOMPSON.